Aug. 22, 1950   W. T. ROSSELL   2,519,853
THERMOSTATIC CONTROL
Filed Sept. 26, 1946

INVENTOR.
WILLIAM T. ROSSELL,
BY

Patented Aug. 22, 1950

2,519,853

UNITED STATES PATENT OFFICE 2,519,853

THERMOSTATIC CONTROL

William T. Rossell, New York, N. Y., assignor to Transit Research Corporation, New York, N. Y., a corporation of New York Application September 26, 1946, Serial No. 699,408

3 Claims. (Cl. 200—141)

This invention relates to thermometers of the type used to control the opening and closing of one or more electric circuits and has for its object to provide a mercury thermometer which will have improved reliability.

Thermostats are often made in the form of mercury thermometers having vertically spaced electrical contacts through the glass walls thereof. When the mercury covers both contacts an electrical circuit is closed and when the mercury falls below the upper contact the circuit is broken. In using such thermostats it is the practice to keep the voltage drop between the two contacts very low in order to prevent arcing because of the very slow motion of the mercury while approaching or receding from a contact.

Since the glass tubes are of capillary size when the temperature falls and the mercury column recedes, the mercury must overcome friction with the glass caused by the capillary action. The mercury column as a whole, due to its small weight, oftentimes cannot do this and a break in the column results. The break may be extremely small but, at the same time, sufficient to preclude a proper flow of current therepast. Tapping on them with the hand or with a small instrument will restore their proper operation, however, their apparent unreliability from this cause is the greatest objection to thermostats of this type.

Figure 1:
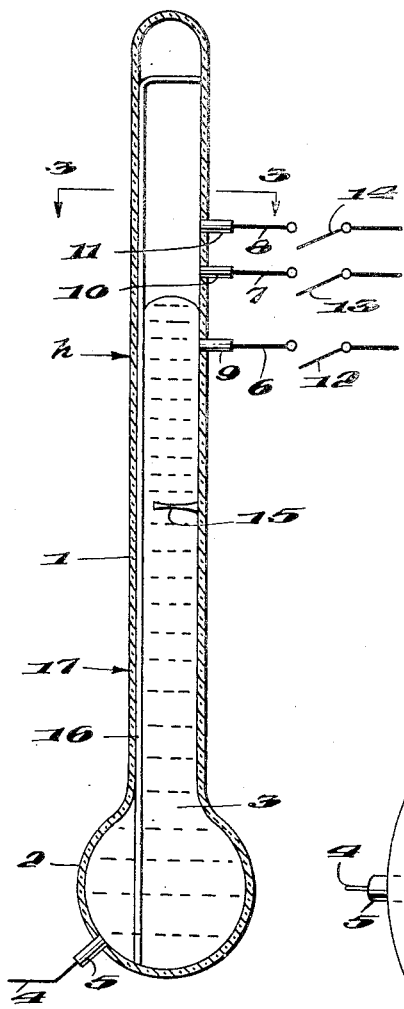
Figure 2:
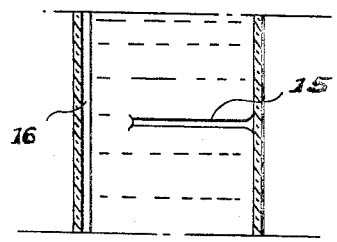
Figure 3:
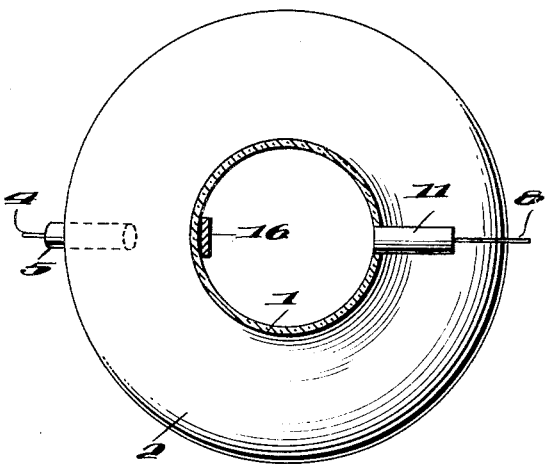

The break in the mercury column always occurs substantially below the top of the column and the break always divides the column horizontally instead of vertically. It is therefore an object of this invention to provide means in the form of a fixed vertical metallic path which will bridge any gap in the mercury and which will therefore leave to the mercury the sole function of establishing a current flow horizontally therethrough. While this metallic bridge may be in the form of a continuous strip or wire within the glass tube, it may also take the form of a plurality of contact or terminal points through the glass substantially at the level of and diametrically opposite the opposed terminal, all of which will now be fully explained with reference to the accompanying drawings in which my invention is illustrated and in which:

Figure 1 is a vertical diametric section through a thermostatic thermometer constructed according to my invention, Figure 2 is an enlarged showing of a portion of the thermometer of Figure 1 taken intermediate the height thereof, Figure 3 is a horizontal section taken along the line 3—3 of Figure 1.

More particularly, 1 indicates a glass tube closed at both ends and enlarged at its lower end to form a bulb 2. This bulb contains mercury 3 which extends to a substantial height in the tube 1. The tube 1 is of capillary size so that the showing to this point may be a conventional glass tube, mercury thermometer in which the top of the mercury column varies in height according to the temperature to which the thermometer and particularly the bulb 2 is subjected. The glass is generally provided with markings by which the temperature may be read at the height of the top of the mercury column.

In order for this thermometer to serve as a thermostat an electrical lead line 4 has a terminal 5 in the bulb and one or more lead lines 6, 7 and 8 having terminals 9, 10 and 11, respectively, through the walls of the tube 1. Each of the lines 6, 7 and 8 is provided with switches 12, 13 and 14 respectively.

In operation, suppose that the switch 12 is closed. When the top of the mercury column 3 contacts the terminal 9 an electric circuit will be established from the line 4 to the line 6. If the mercury column rises to the terminal 10 and the switch 13 is closed an electric circuit will be established from the line 4 to the line 7. And similarly, if the mercury column rises to the height of the terminal 11 and the switch 14 is closed, a circuit will be established from the line 4 to the line 8. When one line 6, 7 or 8 is to be energized it is assumed that the switches 12, 13 and 14 of the other two lines will be opened.

The thermostatic thermometer described thus far is of conventional type. If a circuit, for instance, from the line 4 through the mercury 3 to the line 6 is established and the temperature drops, the mercury recedes in the glass 1. Since the tube is of capillary size the column of mercury as a whole must overcome the capillary action of the glass by virtue of its weight in order to fall. If it is unable to do this there will be one or more breaks or a partial break in the mercury column. A single partial break, of typical form, is indicated at 15. In some instances the space above the mercury column is filled with gas in which case the break 15 will be filled with gas, and in other instances the space above the mercury is a vacuum. There appears to be no difference in operation whether or not the space above the mercury is filled with gas since separation of the column occurs in either case.

It has been noted that the separations in the mercury column always occur horizontally instead of vertically and that they always occur at a substantial distance below the top of the mercury column. I therefore find that it is possible to bridge the gaps, separations and partial separations by inserting in the tube 1 a vertical metallic conductor 16. This conductor is substantially smaller in diameter or cross section than the cross sectional area of the tube 1 and is fixed in the tube 1 along the wall diametrically opposite the contacts 9, 10 and 11. It is preferably made of platinum, since platinum has a minimum of disintegration in mercury, although it is readily wetted by it. It has a length, as illustrated, from the bulb 2 to a point at least as high as the top terminal 11, although it may be shortened at its lower end to some point 17 substantially above the bulb 2 since a separation of the mercury never appears to occur in the lower portion of the column which has a length of the order of one-third the operating length thereof.

With this arrangement a current flow may be reliably established from the terminal 5 through the mercury to the platinum wire 16, thence horizontally across the mercury to a terminal 9, 10 or 11.

In the case of the platinum wire as used in Figures 1, 2 and 3, the wire may be installed in any one of a number of different ways. It may, for instance be dropped into the tube 1 and allowed to rest on the bottom of the bulb 2 and rise to a height (or length) such that it cannot quite contact the lowermost terminal 9 at any time when the thermostat is in vertical position. Or it may be of greater height than the terminals 9, 10 and 11 if the upper end be bent at right angles thereabove to prevent direct contact with the terminals at all times. Or it may be anchored in the tube 1 while the tube is still in molten condition.

Still other ways of carrying my invention into practice will suggest themselves to those skilled in the art, and I therefore desire to be extended protection as defined by the appended claims.

What I claim is:

1. In a mercury thermostat, a sealed glass-like tube of capillary size terminating at its lower end in a bulb and containing mercury, vertically spaced electrical terminals extending through the walls of said tube and integrally united therewith, and a metallic member extending longitudinally within said tube and residing always in spaced relation with all of said terminals.

2. In a mercury thermostat, a sealed glass-like tube of capillary size terminating at its lower end in a bulb and containing mercury, vertically spaced electrical terminals extending through the walls of said tube and integrally united therewith, and a free platinum wire extending longitudinally within said tube and residing in spaced relation with all of said terminals.

3. In a mercury thermostat, a sealed glass-like tube of capillary size terminating at its lower end in a bulb and containing mercury, vertically spaced electrical terminals extending through the walls of said tube, and a free metallic member extending from the region of said bulb upwardly into said tube substantially to the height of the upper of said terminals, said wire being bent at its upper end whereby said wire is forced in spaced relation from said vertically spaced terminals.

WILLIAM T. ROSSELL.

REFERENCES CITED

The following references are of record in the file of this patent:

UNITED STATES PATENTS

| Number | Name | Date |
| --- | --- | --- |
| 402,347 | Patterson | Apr. 30, 1889 |
| 450,896 | Sims | Apr. 21, 1891 |
| 489,259 | Maxim | Jan. 3, 1893 |
| 1,007,574 | Jobson | Oct. 31, 1911 |
| 1,160,795 | Veranich | Nov. 16, 1915 |

FOREIGN PATENTS

| Number | Country | Date |
| --- | --- | --- |
| 15,247 | Switzerland | Sept. 6, 1897 |